(12) United States Patent
Takase et al.

(10) Patent No.: US 6,710,097 B2
(45) Date of Patent: Mar. 23, 2004

(54) PHOTOCURABLE RESIN COMPOSITION AND OPTICAL PARTS

(75) Inventors: Hideaki Takase, Ibaraki (JP); Jirou Ueda, Ibaraki (JP); Takayoshi Tanabe, Ibaraki (JP); Takashi Ukachi, Ibaraki (JP)

(73) Assignees: DSM N.V., Heerlan (NL); JSR Corporation, Tokyo (JP); Japan Fine Coatings Co., Ltd., Tokyo (JP)

( * ) Notice: Subject to any disclaimer, the term of this patent is extended or adjusted under 35 U.S.C. 154(b) by 0 days.

(21) Appl. No.: 09/998,929

(22) Filed: Dec. 3, 2001

(65) Prior Publication Data

US 2003/0021943 A1 Jan. 30, 2003

Related U.S. Application Data

(63) Continuation of application No. PCT/NL00/00350, filed on May 22, 2000.

(30) Foreign Application Priority Data

Jun. 3, 1999 (JP) ............................................ 11/156356

(51) Int. Cl.$^7$ .................................................. C08F 2/46
(52) U.S. Cl. ........................... 522/97; 522/96; 526/301; 523/210; 524/492; 623/6.11
(58) Field of Search ...................... 522/96, 97; 526/301; 524/492; 523/210

(56) References Cited

U.S. PATENT DOCUMENTS 5,913,004 A * 6/1999 Takase et al. ................ 385/123
6,013,714 A * 1/2000 Haruta et al. ................ 524/492
6,440,519 B1 * 8/2002 Takase et al. ............... 428/65.2

FOREIGN PATENT DOCUMENTS

| EP | 168226 | 1/1986 |
|---|---|---|
| GB | 2163755 | 3/1986 |
| JP | 6016721 | 1/1994 |
| JP | 10324726 | 12/1998 |
| WO | 9611965 | 4/1996 |
| WO | 9628396 | 9/1996 |
| WO | 9700276 | 1/1997 |

* cited by examiner

Primary Examiner—Tatyana Zalukaeva
(74) Attorney, Agent, or Firm—Pillsbury Winthrop LLP

(57) ABSTRACT

A photocurable resin composition comprising:

(A) a urethane (meth)acrylate produced by reacting at least a polyether polyol with a number average molecular weight of 500 or more having an alkyleneoxy structure in the molecule, an organic polyisocyanate compound, and a (meth)acrylate containing a hydroxyl group;

(B) a monofunctional (meth)acrylate shown by the following formula (1), $$CH_2=C(R^1)-COO-R^2-\text{Ar}(Y^1)(Y^2)(Y^3) \quad (1)$$

wherein $R^1$ represents a hydrogen atom or a methyl group, $R^2$ represents $-(CH_2CH_2O)_p-$, $-(CH(CH_3)CH_2O)_q-$, or $-CH_2CH(OH)CH_2O-$, $Y^1$, $Y^2$, and $Y^3$ individually represent a hydrogen atom, bromine atom, alkyl group having 1–10 carbon atoms, phenyl group, or $-C(CH_3)_2C_6H_5-$, and p and q represent integers from 0 to 10; and (C) a photoinitiator;

its use and optical parts prepared from the photocurable resin composition.

9 Claims, 2 Drawing Sheets

[Figure 1]
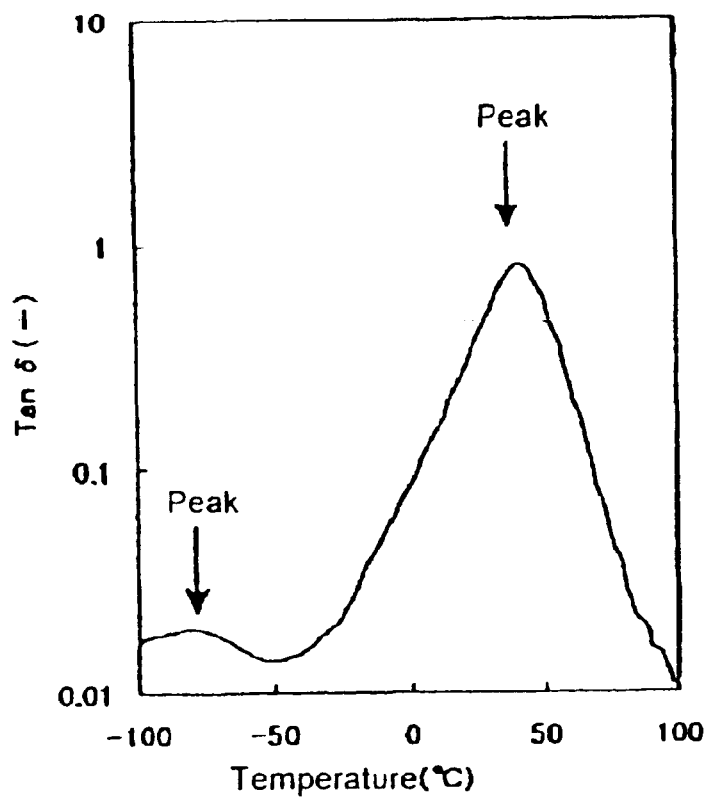
Temperature dependency curve of loss tangent

[Figure 2]
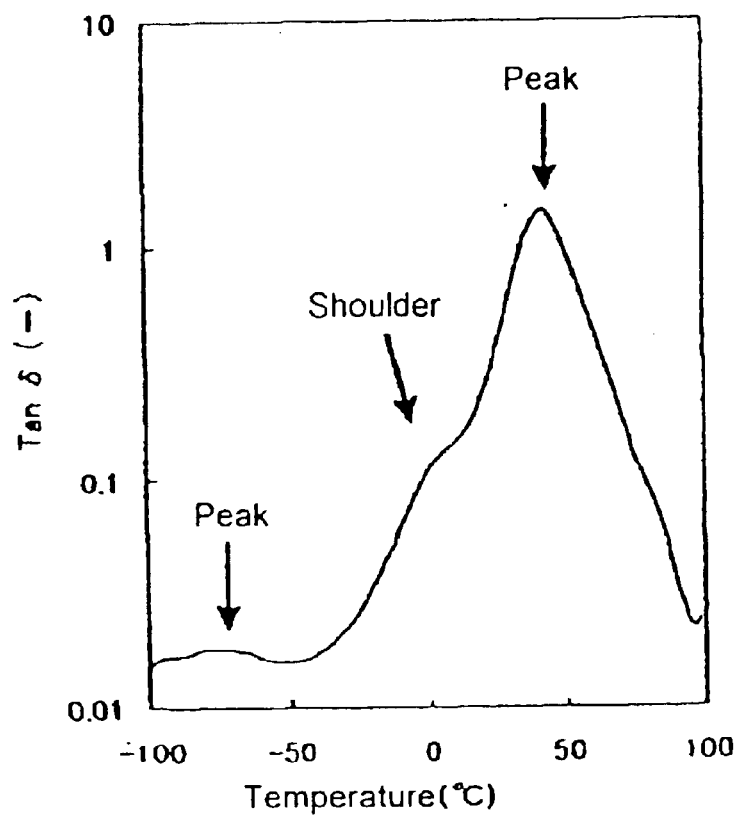
Temperature dependency curve of loss tangent

PHOTOCURABLE RESIN COMPOSITION AND OPTICAL PARTS

This is a Continuation of International Application No. PCT/NL00/00350 filed May 22, 2000 which designated the U.S. and was published in the English language. The contents of this PCT application are incorporated in their entirety by reference.

The present invention relates to a photocurable resin composition. More particularly, the present invention relates to a photocurable resin composition useful for forming optical parts, for example, a lens for lens sheets, such as a prism lens sheet used for a backlight of a liquid crystal display and a Fresnel lens sheet or a lenticular lens sheet used for a screen of a projection TV, or a backlight using such sheets.

PRIOR ART

Lenses such as a Fresnel lens and a lenticular lens have been manufactured by a press method or a cast method. These methods require a long period of time for manufacturing a lens, thereby resulting in poor productivity. In order to solve this problem, a method of manufacturing a lens using a UV-curable resin has been attempted in recent years. Such a method comprises pouring a UV-curable resin composition between a mold having a lens shape and a transparent resin substrate, and curing the composition by irradiating with ultraviolet rays from the side of the substrate to manufacture the lens in a short period of time. Accompanied by the development of thinner and larger projection TVs or video projectors, resins for forming a lens provided with various lens properties such as a higher refractive index and mechanical properties have been proposed and examined. For example, Japanese Patent Application Laid-open No. 2554363/1993 discloses a UV-curable resin composition for a translucent screen which comprises (A) a urethane (meth) acrylate produced by reacting (a) a diol compound produced by reacting bisphenol A with ethylene oxide and the like, (b) a diol compound with a molecular weight of 200 or less, (c) an organic polyisocynate, and (d) a (meth)acrylate containing a hydroxyl group, (B) a compound containing an ethylenically unsaturated group other than the component (A), and (C) a photoinitiator.

PROBLEMS TO BE SOLVED BY THE INVENTION

However, conventional UV curable resin compositions could not produce a cured product which satisfies the required lens properties such as adhesion to substrates, abrasion resistance, and restorability of the shape.

BRIEF DESCRIPTION OF THE DRAWINGS

FIG. 1 shows a temperature dependency curve of a loss tangent with two peaks.

FIG. 2 shows a temperature dependency curve of a loss tangent with two peaks and one shoulder.

MEANS TO SOLVE THE PROBLEMS

The present inventors have conducted extensive studies to solve the problems in conventional resin compositions. As a result, the inventors have found that optical parts, in particular, a translucent screen such as a Fresnel lens and a lenticular lens having a high refractive index and exhibiting excellent releasability from molds, adhesion to substrates, abrasion resistance, and restorability of the shape can be manufactured by using a cured product of a photocurable resin composition comprising (A) a urethane (meth)acrylate produced by reacting a polyether polyol with a number average molecular weight of 500 or more which comprises an alkyleneoxy group, an organic polyisocyanate, a (meth)acrylate containing a hydroxyl group, and a dial shown by the following formula (2) as required, and (B) a monofunctional (meth)acrylate which comprises a phenyl group. This finding has led to the completion of the present invention.

Specifically, the present invention provides a photocurable resin composition comprising:

(A) a urethane (meth)acrylate produced by reacting at least a polyether polyol with a number average molecular weight of 500 or more having an alkyleneoxy structure in the molecule, an organic polyisocyanate compound, and a (meth)acrylate containing a hydroxyl group;

(B) a monofunctional (meth)acrylate shown by the following formula (1),

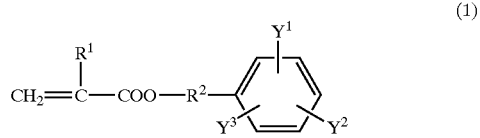

wherein $R^1$ represents a hydrogen atom or a methyl group, $R^2$ represents $-(CH_2CH_2O)_p-$, $-(CH(CH_3)CH_2O)_q-$, or $-CH_2CH(OH)CH_2O-$, $Y^1$, $Y^2$, and $Y_3$ individually represent a hydrogen atom, bromine atom, alkyl group having 1–10 carbon atoms, phenyl group, or $-C(CH_3)_2C_6H_5-$, and p and q represent integers from 0 to 10; and (C) a photoinitiator.

The present invention also provides the photocurable resin composition, of which the component (A) is a urethane (meth)acrylate which is produced by reacting a diol shown by the following formula (2), a polyether polyol with a number average molecular weight of 500 or more having an alkyleneoxy structure in the molecule, an organic polyisocyanate compound, and a (meth)acrylate containing a hydroxyl group,

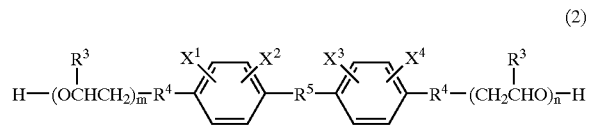

wherein each $R^3$ individually represents a hydrogen atom or a methyl group, each $R^4$ individually represents an oxygen atom or sulphur atom, $R_5$ represents $-CH_2-$, $-C(CH_3)_2-$, $-S-$, $-SO-$, or $-SO_2-$, $X^1$, $X^2$, $X^3$, and $X^4$ individually represent a hydrogen atom, a methyl group, or bromine atom, and m and n represent integers from 0 to 9.

The present invention further provides optical parts comprising a cured product of the above photocurable resin composition.

PREFERRED EMBODIMENT OF THE INVENTION

The component (A) of the photocurable resin composition of the present invention is a urethane (meth)acrylate produced by reacting at least a polyether polyol with a number average molecular weight of 500 or more which comprises an alkyleneoxy structure in the molecule, an organic polyisocyanate compound, and a (meth)acrylate containing a hydroxyl group.

Examples of the polyether polyol having an alkyleneoxy structure in the molecule include polyethylene glycol, polypropylene glycol, polytetramethylene glycol, polyhexamethylene glycol, polyheptamethylene glycol, polydecamethylene glycol, and a polyether diol produced by the ring-opening copolymerization of at least two ion-polymerizable cyclic compounds. As examples of the ion-polymerizable cyclic compounds, cyclic ethers such as ethylene oxide, propylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidyl benzoate can be given. As specific examples of the combinations of at least two ion-polymerizable cyclic compounds, binary copolymers of tetrahydrofuran and propylene oxide, tetrahydrofuran and 2-methyltetrahydrofuran, tetrahydrofuran and 3-methyltetrahydrofuran, tetrahydrofuran and ethylene oxide, and butene-1-oxide and ethylene oxide, and ternary copolymers of tetrahydrofuran, butene-oxide, and ethylene oxide, and tetrahydrofuran, butene-1-oxide, and ethylene oxide can be given. A polyether diol produced by the ring-opening copolymerization of these ion-polymerizable cyclic compounds and cyclic imines such as ethyleneimine, cyclic lactonic acids such as β-propyolactone and glycolic acid lactide, or dimethylcyclopolysiloxanes can also be used. The ring-opening copolymers of the ion-polymerizable cyclic compounds may be either a random copolymer or a block copolymer. The polystyrene-reduced number average molecular weight of these polyether polyols is 500 or more. If the number average molecular weight is less than 500, increased viscosity of the resin composition may cause problems in the manufacturing process or lens properties such as adhesion to substrates, abrasion resistance, and restorability of the shape may be insufficient. Examples of commercially available products of the above polyether polyols include PTMG650, PTMG1000, PTMG2000 (manufactured by Mitsubishi Chemical Corp.), PPG700, PPG1000, EXCENOL2020, 1020 (manufactured by Asahi Glass Urethane Co., Ltd.), PEG1000, UNISAFE DC1100, DC1800 (manufactured by Nippon Oil and Fats Co., Ltd.), PTG650(SN), PTG1000 (SN), PTG2000(SN), PTG3000(SN), PPTG2000, PPTG1000, PTGL1000, PTGL2000 (manufactured by Hodogaya Chemical Co., Ltd.), Z-3001-4, Z-3001-5, PBG2000, PBG2000B (manufactured by Daiichi Kogyo Seiyaku Co., Ltd.), and the like can be given.

As examples of the organic polyisocyanate compound used for producing the urethane (meth)acrylate (A), 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, and 4,4'-biphenylene diisocyanate can be given. Of these, 2,4-tolylene diisocyanate, 2,6-tolylene diisocyanate, 1,3-xylylene diisocyanate, and 1,4-xylylene diisocyanate are particularly preferable.

As examples of the (meth)acrylate containing a hydroxyl group used for producing the urethane (meth)acrylate (A), 2-hydroxyethyl (meth)acrylate, 2-hydroxypropyl (meth) acrylate, 2-hydroxybutyl (meth)acrylate, 2-hydroxy-3-phenyloxypropyl (meth)acrylate, 1,4-butanediol mono (meth)acrylate, 2-hydroxyalkyl(meth)acryloyl phosphate, 4-hydroxycyclohexyl (meth)acrylate, 1,6-hexanediol mono (meth)acrylate, neopentyl glycol mono(meth)acrylate, trimethylolpropane di(meth)acrylate, trimethylolethane di(meth) acrylate, pentaerythritol tri(meth)acrylate, dipentaerythritol penta(meth)acrylate, and (meth)acrylate shown by the following formula (3) can be given:

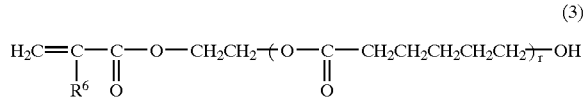

wherein $R^6$ represents a hydrogen atom or a methyl group and r represents an integer from 1 to 15.

Compounds produced by the addition reaction of (meth) acrylic acid and a compound containing a glycidyl group for example an alkyl glycidyl ether, allyl glycidyl ether, and glycidyl (meth)acrylate can also be used. These hydroxyl group-containing (meth)acrylates may be used either individually or in combinations of two or more.

The urethane (meth)acrylate (A) includes a urethane (meth)acrylate produced by reacting the above three components with the diol shown by the formula (2). The urethane (meth)acrylate produced by reacting these four components is particularly preferable.

In the formula (2), m and n represent integers from 0 to 9, and preferably from 1 to 9. As examples of the diol shown by the formula (2), an ethylene oxide addition product of bisphenol A (m=n=1.3), ethylene oxide addition product of bisphenol A (m=n=2), ethylene oxide addition product of bisphenol A (m=n=5), propylene oxide addition product of bisphenol A (m=n=1.1), propylene oxide addition product of bisphenol A (m=n=1.5), propylene oxide addition product of bisphenol A (m=n=3), ethylene oxide addition product of bisphenol F (m=n=2), ethylene oxide addition product of bisphenol F (m=n=4), propylene oxide addition product of bisphenol F (m=n=2), ethylene oxide addition product of bisphenol S (m=n=2), propylene oxide addition product of bisphenol S (m=n=2), ethylene oxide addition product of tetrabromobisphenol A (m=n=2), and the like can be given. Preferably, the polystyrene-reduced number average molecular weight of the diol shown by the formula (2) is 1000 or less.

As examples of commercially available products of the diol shown by the formula (2), DA-400, DA-550, DA-700, DB-400, DB-530, DB-900, DAB-800 (manufactured by Nippon Oil and Fats Co., Ltd.), and the like can be given.

Given as a method of reacting the polyether polyol having an alkyleneoxy structure in the molecule, a diol shown by the formula (2) as required (these diol and polyether polyol may be together referred to as two polyols), organic polyisocyanate compound, and hydroxyl group-containing (meth)acrylate for producing the urethane (meth)acrylate (A) are: (1) a method of charging the above one or two polyols, organic polyisocyanate compound, and hydroxyl group-containing (meth)acrylate and reacting these compounds all together; (2) a method of reacting the above one or two polyols and the organic polyisocyanate compound, and reacting the resulting product with the hydroxyl group-containing (meth)acrylate; (3) a method of reacting the organic polyisocyanate compound and the hydroxyl group-containing (meth)acrylate, and reacting the resulting product with the above one or two polyols; (4) and a method of reacting the organic polyisocyanate compound with a first hydroxyl group-containing (meth)acrylate, reacting the resulting product with the above one or two polyols, and then reacting the resulting product with a second hydroxyl group-containing (meth)acrylate. Of these methods, the method of reacting the organic polyisocyanate compound and the hydroxyl group-containing (meth)acrylate, and reacting the resulting product with the above one or two polyols is preferable for producing the urethane (meth) acrylate of the present invention.

When producing the urethane (meth)acrylate (A), it is preferable to add the one or two polyols, organic polyisocyanate compound, and hydroxyl group-containing (meth) acrylate so that isocyanate groups included in the organic polyisocyanate compound and hydroxyl groups included in the hydroxyl group-containing (meth)acrylate are respectively 1.1–1.5 equivalents and 0.1–0.5 equivalent for one equivalent of hydroxyl groups included in the one or two polyols.

The urethane (meth)acrylate (A) must contain the one or two polyols in the molecule by the reaction with the organic isocyanate compound. The proportion of the diol shown by the formula (2) is preferably 10–70 wt % for 30–90 wt % of the polyether polyol. If the urethane (meth)acrylate (A) does not contain both of the two polyols in the molecule, the cured product does not satisfy the objective refractive index or modulus of elasticity, whereby the performance as optical parts is inadequate.

In the reaction of these three or four components, a urethanization catalyst such as copper naphthenate, cobalt naphthenate, zinc naphthenate, di-n-butyl tin dilaurate, triethylamine, and triethylenediamine-2-methyltriethyleneamine is added in an amount from 0.01 to 1 wt % for the total amount of the raw materials. The reaction is carried out preferably at 10–90° C., and particularly preferably at 30–80° C.

The number average molecular weight of the urethane (meth)acrylate (A) is preferably from 1,000 to 20,000, and particularly preferably from 1,500 to 15,000. If the number average molecular weight of the urethane (meth)acrylate (A) is less than 1,000, the modulus of elasticity of the cured product produced by curing the resin composition increases extremely, thereby causing a break or crack when used as a lens. If the number average molecular weight exceeds 20,000, handling of the resin composition may become difficult due to the increased viscosity.

The urethane (meth)acrylate (A) is added to the resin composition in an amount preferably from 20 to 80 wt %, and still more preferably from 30 to 70 wt %. The lower limit of this range is provided for giving the cured product appropriate mechanical properties such as mechanical strength and toughness, preventing a break or crack when used as a lens sheet, and ensuring easy restoration of the lens shape when crushed. The upper limit of this range is provided for preventing the workability or applicability from decreasing due to the increased viscosity of the composition.

The monofunctional (meth)acrylate shown by the formula (1) is used as the component (B) of the photocurable resin composition of the present invention. Examples of the component (B) include phenoxyethyl (meth)acrylate, phenoxy-2-methylethyl (meth)acrylate, phenoxyethoxyethyl (meth)acrylate, 3-phenoxy-2-hydroxypropyl (meth) acrylate, 2-phenylphenoxyethyl (meth)acrylate, 4-phenylphenoxyethyl (meth)acrylate, 3-(2-phenylphenyl-2-hydroxypropyl (meth)acrylate, (meth)acrylate of p-cumylphenol which is reacted with ethylene oxide, 2-bromophenoxyethyl (meth)acrylate, 2,4-dibromophenoxyethyl (meth)acrylate, 2,4,6-tribromophenoxyethyl (meth)acrylate, and the like. Of these, phenoxyethyl (meth)acrylate, phenoxyethoxyethyl (meth) acrylate, (meth)acrylate of p-cumylphenol reacted with ethylene oxide, 2,4,6-tribromophenoxyethyl (meth)acrylate, and the like are particularly preferable.

As examples of commercially available products used as the component (B), Aronix M110, M101, M5700, TO-1317 (manufactured by Toagosei Co., Ltd.), Viscoat #192, #193, #220, 3BM (manufactured by Osaka Organic Chemical Industry Co., Ltd.), NK Ester AMP-10G, AMP-20G (manufactured by Shin-Nakamura Chemical Co., Ltd.), Light Acrylate PO-A, P-200A, Epoxy Ester M-600A (manufactured by Kyoeisha Chemical Co., Ltd.), PHE, CEA, PHE-2, BR-31, BR-31M, BR-32 (manufactured by Daiichi Kogyo Seiyaku Co., Ltd.), and the like can be given.

The proportion of the component (B) added in the composition is preferably 10–70 wt %, and particularly preferably 20–60 wt %. The lower limit of this range is provided for ensuring both adhesion to substrates and a refractive index. The upper limit of this range is provided for ensuring sufficient mechanical properties and applicability.

In the present invention, a compound having a (meth) acryloyl group or a vinyl group other than the component (B) can be used as an optional component (hereinafter referred to as "unsaturated monomer"). As the unsaturated monomer, a monofunctional monomer and a polyfunctional monomer can be used. As examples of the monofunctional monomer, a vinyl monomer such as N-vinylpyrrolidone, N-vinylcaprolactam, vinylimidazole, and vinylpyridine; isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth) acrylate, methyl (meth)acrylate, ethyl (meth)acrylate, propyl (meth)acrylate, isopropyl (meth)acrylate, butyl (meth) acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth) acrylate, isostearyl (meth)acrylate, tetrahydrofurfuryl (meth)acrylate, butoxyethyl (meth)acrylate, ethoxydiethylene glycol (meth)acrylate, polyethylene glycol mono(meth) acrylate, polypropylene glycol mono(meth)acrylate, methoxy ethylene glycol (meth)acrylate, ethoxyethyl (meth) acrylate, methoxyolyethylene glycol (meth)acrylate, methoxypolypropylene glycol (meth)acrylate, diacetone (meth)acrylamide, isobutoxymethyl (meth)acrylamide, N,N-dimethyl(meth)acrylamide, t-octyl(meth)acrylamide, dimethylaminoethyl (meth)acrylate, diethylaminoethyl (meth)acrylate, 7-amino-3,7-dimethyloctyl (meth)acrylate, N,N-diethyl(meth)acrylamide, N,N-dimethylaminopropyl (meth)acrylamide, hydroxy butyl ether, lauryl vinyl ether, cetyl vinyl ether, 2-ethylhexyl vinyl ether, and monofunctional monomers shown by the following formulas (4) and (5) can be given:

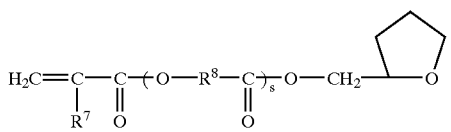
(4)

wherein R⁷ represents a hydrogen atom or a methyl group, R⁸ represents an alkylene group having 2–8 carbon atoms, and s represents an integer from 1 to 8;

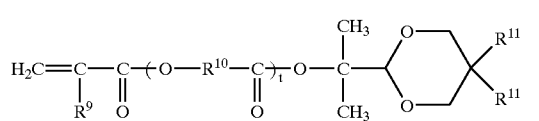
(5)

wherein $R^9$ and $R^{11}$ independently represent a hydrogen atom or a methyl group, $R^{10}$ represents an alkylene group having 2–8 carbon atoms, and t represents an integer from 1 to 8.

As examples of commercially available products of the monofunctional monomers, Aronix M111, M113, M117 (manufactured by Toagosei Co., Ltd.), LA, IBXA, Viscoat #190, #2000 (manufactured by Osaka Organic Chemical Industry Co., Ltd.), Light Acrylate EC-A, NP-4EA, NP-8EA, HOA-MPL (manufactured by Kyoeisha Chemical Co., Ltd.), KAYARAD TC110S, R629, R644 (manufactured by Nippon Kayaku Co., Ltd.), FA-511A, 512A, 513A (manufactured by Hitachi Chemical Co., Ltd.), VP (manufactured by BASF), ACMO, DMAA, DMAPAA (manufactured by KOHJIN Co., Ltd.), and the like can be given.

As examples of the polyfunctional monomers, acrylate compounds such as trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris (2-hydroxyethyl)isocyanurate tri(meth)acrylate, tris(2-hydroxyethyl)isocyanurate di(meth)acrylate, bis (hydroxymethyl)tricyclodecane di(meth)acrylate, dipentaerythritol hexa(meth)acrylate, di(meth)acrylate of a diol which is an addition product of polyethylene oxide or propylene oxide to bisphenol A, di(meth)acrylate of a diol which is an addition product of ethylene oxide or propylene oxide to hydrogenated bisphenol A, epoxy(meth)acrylate produced by adding (meth)acrylate to diglycidyl ether of bisphenol A, and triethylene glycol divinyl ether can be given.

As examples of commercially available products of the polyfunctional monomers, Yupimer UV SA1002, SA2007 (manufactured by Mitsubishi Chemical Corp.), Viscoat #195, #230, #215, #260, #335HP, #295, #300, #360, #700, GPT, 3PA (manufactured by Osaka Organic Chemical Industry Co., Ltd.), Light Acrylate 4EG-A, 9EG-A, NP-A, DCP-A, BP-4EA, BP-4PA, TMP-A, PE-3A, PE-4A, DPE-6A (manufactured by Kyoeisha Chemical Co., Ltd.), KAYARAD PET-30, TMPTA, R-604, DPHA, DPCA-20, -30, -60, -120, HX-620, D-310, D-330 (manufactured by Nippon Kayaku Co., Ltd.), Aronix M-208, M-210, M-215, M-220, M-240, M-305, M-309, M-310, M-315, M-325, M-400 (manufactured by Toagosei Co., Ltd.), Ripoxy VR-77, VR-60, VR-90 (manufactured by Showa Highpolymer Co., Ltd.) and the like can be given.

The photocurable resin composition of the present invention is cured by radiation. Radiation used herein includes ionizing radiation such as infrared rays, visible rays, ultraviolet rays, X-rays, electron beams, α-rays, β-rays, γ-rays, and the like. The photoinitiator which is the component (C) is required for curing the composition and a photosensitizer is optionally added. As the photoinitiator, any compound which dissolves upon irradiation and generates radicals to initiate the polymerization can be used. Examples of such compounds include acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyl diphenylphosphine oxide, and bis-(2,6-dimethoxybenzoyl)-2,4,4-trimethylpentylphosphine oxide.

As examples of commercially available products of the photoinitiator, Irgacure184, 369, 651, 500, 819, 907, 784, 2959, CGI1700, CGI1750, CGI 1850, CG24-61, Darocur 1116, 1173 (manufactured by Ciba Specialty Chemicals Co., Ltd.), Lucirin LR8728 (manufactured by BASF), Ubecryl P36 (manufactured by UCB), and the like can be given.

As examples of the photosensitizer, triethylamine, diethylamine, N-methyldiethanoleamine, ethanolamine, 4-dimethylaminobenzoic acid, methyl 4-dimethylaminobenzoate, ethyl 4-dimethylaminobenzoate, and isoamyl 4-dimethylaminobenzoate can be given. As commercially available products of the photosensitizer, Ubecryl P102, 103, 104, and 105 (manufactured by UCB) can be given.

The optimum amount of the photoinitiator used to cure the resin composition of the present invention is from 0.01 to 10 wt %, and preferably from 0.5 to 7 wt % of the total amount of the composition. The upper limit of this amount is preferable in terms of ensuring the curing characteristics of the composition, mechanical and optical properties, and handling of the cured product. The lower limit of this amount is preferable in terms of preventing the curing rate from decreasing.

A heat-polymerization initiator can be optionally added together when curing the resin composition of the present invention. Peroxides and azo compounds can be given as examples of preferable heat-polymerization initiators. Specific examples include benzoyl peroxide, t-butyl peroxybenzoate, azobisisobutyronitrile, and the like.

Curable oligomers or polymers other than the above components may be added to the resin composition of the present invention insofar as the characteristics of the resin composition are not adversely affected. As examples of such curable oligomers or polymers, polyurethane (meth)acrylate other than the component (A), polyester (meth)acrylate, epoxy (meth)acrylate, polyamide (meth)acrylate, siloxane polymers having a (meth)acryloyloxy group, and reactive polymers produced by reacting a copolymer of glycidyl methacrylate and other polymerizable monomers with (meth)acrylic acid can be given.

In addition to the above components, additives such as antioxidants, UV absorbers, light stabilizers, silane coupling agents, coating surface improvers, heat-polymerization inhibitors, leveling agents, surfactants, coloring agents, preservatives, plasticizers, lubricants, solvents, fillers, aging preventives, wettability improvers, and the like can be added as required. Examples of antioxidants include Irganox 1010, 1035, 1076, 1222 (manufactured by Ciba Specialty Chemicals Co., Ltd.), Antigene P, 3C, FR, GA-80 (manufactured by Sumitomo Chemical Industries Co., Ltd.), and the like. Examples of UV absorbers include Tinuvin P, 234, 320, 326, 327, 328, 329, 213 (manufactured by Ciba Specialty Chemicals Co., Ltd.), Seesorb 102, 103, 110, 501, 202, 712, 704 (manufactured by Sypro Chemical Co., Ltd.), and the like. Examples of light stabilizers include Tinuvin 292, 144, 622LD (manufactured by Ciba Specialty Chemicals Co., Ltd.), Sanol LS770 (manufactured by Sankyo Co., Ltd.), Sumisorb TM-061 (manufactured by Sumitomo Chemical Industries Co., Ltd.), and the like. Examples of silane coupling agents include γ-aminopropyltriethoxysilane, γ-mercaptopropyltrimethoxysilane, and γ-methacryloxypropyltrimethoxysilane, and commercially available products such as SH6062, SH6030 (manufactured by Toray-Dow Corning Silicone Co., Ltd.), and KBE903, KBE603, KBE403 (manufactured by Shin-Etsu Chemical Co., Ltd.). Examples of coating surface improvers include silicone additives such as dimethylsiloxane polyether and commercially available products such as DC-57, DC-190 (manufactured by Dow-Corning), SH-28PA, SH-29PA, SH-30PA, SH-190 (manufactured by Toray-Dow Corning Silicone Co., Ltd.), KF351, KF352, KF353, KF354 (manufactured by Shin-Etsu Chemical Co., Ltd.), and L-700, L-7002, L-7500, FK-024-90 (manufactured by Nippon Unicar Co., Ltd.).

The resin composition of the present invention is manufactured by mixing the above components using a conventional method. Viscosity of the resin composition of the present invention thus prepared is usually from 200 to 50,000 cps (mPa.sec)/25° C., and preferably from 500 to 30,000 cps (mPa.sec)/25° C. If the viscosity is too high, uneven coating or crinkling occurs or the objective lens thickness cannot be secured, thereby resulting in inadequate lens performance. If the viscosity is too low, it is difficult to control the lens thickness, whereby a lens with a uniform thickness cannot be manufactured.

It is particularly preferable that the cured product prepared by curing the resin composition of the present invention by radiation have the following properties.

The cured product produces a temperature dependency curve of a loss tangent having at least two peaks or shoulders at a temperature range between −150 and 100° C. when an oscillation frequency of 10 Hz is applied using a dynamic viscoelasticity measuring device. If a translucent screen such as a lens sheet is formed from the resin composition of which the cured product satisfies this property, such a translucent screen exhibits superior adhesion to substrates, restorability of the shape, and moderate mechanical properties. Therefore, abrasion and break of the lens can be avoided. If the lens is crushed, the original shape can be immediately restored.

The refractive index of the cured product at 25° C. is preferably 1.53 or more, and still more preferably 1.54 or more. If the refractive index is less than 1.53, a translucent screen formed from the resin composition may exhibit insufficient frontal brightness.

When pulling the cured product at a rate of 10 mm/min., a Young's modulus of elasticity of the cured product determined from the stress at which the distortion amount is 2% (hereinafter referred to as "modulus of elasticity") is preferably between 0.5 kg/mm² and 30 kg/mm². If the modulus of elasticity is more than 30 kg/mm², the lens projection may break or be abraded when using the resin composition as a lens sheet, whereby the lens performance may become inadequate. If the modulus of elasticity is less than 0.5 kg/mm², the lens performance may be inadequate because the lens projection is crushed when superposing the lenses, or it is difficult to remove the lens from the mold, thereby causing inefficient production.

EXAMPLES

The present invention will be explained in more detail by examples, which are not intended to be limiting of the present invention.

Examples 1–4 and Comparative Examples 1–3

Urethane (meth)acrylate Synthesis Example 1

A reaction vessel equipped with a stirrer was charged with 24.21 wt % of 2,4-tolylene diisocyanate, 0.08 wt % of di-n-butyltin dilaurate, and 0.03 wt % of 2,6-di-t-butyl-p-cresol. The mixture was cooled to 5–10° C. 10.76 wt % of 2-hydroxyethyl acrylate was added dropwise while stirring and maintaining the temperature at 30° C. or less. After the addition, the mixture was reacted for one hour at 30° C. 46.37 wt % of polytetramethylene glycol with a number average molecular weight of 1,000 was then added and the mixture was reacted at 50° C. for one hour. After the addition of 18.55 wt % of an ethylene oxide addition product of bisphenol A (m=n=2.0), the mixture was reacted at 50–70° C. for two hours. The reaction was terminated when the residual isocyanate was 0.1 wt % or less. The urethane acrylate thus produced is referred to as "A-1".

Urethane (meth)acrylate Synthesis Example 2

A reaction vessel equipped with a stirrer was charged with 25.48 wt % of 2,4-tolylene diisocyanate, 0.08 wt % of di-n-butyltin dilaurate, and 0.03 wt % of 2,6-di-t-butyl-p-cresol. The mixture was cooled to 5–10° C. 8.5 wt % of 2-hydroxyethyl acrylate was added dropwise while stirring and maintaining the temperature at 30° C. or lower. After the addition, the mixture was reacted for one hour at 30° C. 36.62 wt % of polypropylene glycol with a number average molecular weight of 1,000 was then added and the mixture was reacted at 50° C. for one hour. After the addition of 29.29 wt % of an ethylene oxide addition product of bisphenol A (m=n=2.0), the mixture was reacted at 50–70° C. for two hours. The reaction was terminated when the residual isocyanate was 0.1 wt % or less. The urethane acrylate thus produced is referred to as "A-2".

Urethane (meth)acrylate Synthesis Example 3

A reaction vessel equipped with a stirrer was charged with 24.48 wt % of 2,4-tolylene diisocyanate, 0.08 wt % of di-n-butyltin dilaurate, and 0.03 wt % of 2,6-di-t-butyl-p-cresol. The mixture was cooled to 5–10° C. 15.62 wt % of 2-hydroxy-3-phenyloxypropyl acrylate was added dropwise while stirring and maintaining the temperature at 30° C. or less. After the addition, the mixture was reacted for one hour at 30° C. 45.72 wt % of polytetramethylene glycol with a number average molecular weight of 650 was then added and the mixture was reacted at 50° C. for one hour. After the addition of 14.07 wt % of an ethylene oxide addition product of bisphenol A (m=n=2.0), the mixture was reacted at 50–70° C. for two hours. The reaction was terminated when the residual isocyanate was 0.1 wt % or less. The urethane acrylate thus produced is referred to as "A-3".

Synthesis Comparative Example 1 of Urethane (meth)acrylate

A reaction vessel equipped with a stirrer was charged with 42.88 wt % of 2,4-tolylene diisocyanate, 0.08 wt % of di-n-butyltin dilaurate, and 0.03 wt % of 2,6-di-t-butyl-p-cresol. The mixture was cooled to 5–10° C. 19.08 wt % of 2-hydroxyethyl acrylate was added dropwise while stirring and maintaining the temperature at 30° C. or less. After the addition, the mixture was reacted for one hour at 30° C. 5.09 wt % of ethylene glycol was then added and the mixture was reacted for one hour. After the addition of 32.86 wt % of an ethylene oxide addition product of bisphenol A (m=n=2.0), the mixture was reacted at 50–70° C. for two hours. The reaction was terminated when the residual isocyanate was 0.1 wt % or less. The urethane acrylate thus produced is referred to as "D-1".

Synthesis Comparative Example 2 of Urethane (meth)acrylate

A reaction vessel equipped with a stirrer was charged with 37.14 wt % of 2,4-tolylene duisocyanate, 0.08 wt % of di-n-butyltin dilaurate, and 0.03 wt % of 2,6-di-t-butyl-p-cresol. The mixture was cooled to 5–10° C. 16.5 wt % of 2-hydroxyethyl acrylate was added dropwise while stirring and maintaining the temperature at 30° C. or less. After the addition, the mixture was reacted for one hour at 30° C. 17.79 wt % of polytetramethylene glycol with a number average molecular weight of 250 was then added and the mixture was reacted at 50° C. for one hour. After the addition of 28.46 wt % of an ethylene oxide addition product of bisphenol A (m=n=2.0), the mixture was reacted at 50–70° C. for two hours. The reaction was terminated when the residual isocyanate was 0.1 wt % or less. The urethane acrylate thus produced is referred to as "D-2".

Example 1

A reaction vessel equipped with a stirrer was charged with 38.8 wt % of "A-1" as the component (A), 24.3 wt % of phenoxyethyl acrylate and 11.7 wt % of acrylate of p-cumylphenol to which ethylene oxide was added as the component (B), 2.8 wt % of 1-hydroxycyclohexyl phenyl ketone as the component (C), 10.7 wt % of epoxy (meth)acrylate produced by adding acrylate to diglycidyl ether of bisphenol A, 11.2 wt % of diacrylate of diol which is a polyethylene oxide addition product of bisphenol A, and 0.5 wt % of SH-190 which is a coating surface improver as the other components. The mixture was stirred for one hour while maintaining the liquid temperature at 50–60° C. to obtain a liquid curable resin composition with a viscosity of 7,200 cps (mPa.sec)/25° C.

As for Examples 2–4 and Comparative Examples 1–3, liquid resin compositions were obtained by charging the reaction vessel with the components shown in Table 1 and reacting the components.
Evaluation Method Test specimens were prepared using the liquid curable resin compositions obtained in the examples according to the method described below. The viscosity, temperature dependency curve of a loss tangent, refractive index, modulus of elasticity, releasability, adhesion to the substrate, abrasion resistance, and restorability of the shape were measured as follows.
(1) Viscosity Viscosity at 25° C. was measured using a rotational viscometer according to JIS K7117.
(2) Preparation of Test Specimen for Measuring Temperature Dependency Curve of Loss Tangent, Refractive Index, and Modulus of Elasticity The liquid curable resin composition was applied to a glass plate to a thickness of about 200 μm using a 15 mil applicator bar. The coating was irradiated with ultraviolet rays at a dose of 1.0 J/cm$^2$ in air to produce a cured film. The cured film removed from the glass plate was conditioned at a temperature of 23° C. and a relative humidity of 50% for 24 hours to prepare a test specimen.
(3) Measurement of Temperature Dependency Curve of Loss Tangent The loss tangent from −150 to 100° C. was measured at a temperature rising rate of 3° C./min., while applying a forced oscillation with an oscillation frequency of 3.5 Hz and an amplitude of 10 μm in the direction along the length of the test specimen (cut to a length of 30 mm, a width of 3 mm, and a thickness of 0.2 mm) using a dynamic viscoelasticity measuring device ("RHEOVIBRON" manufactured by ORIENTECH ELECTRONICS CORP.). The number of peaks and shoulders was measured at a temperature between −150 and 100° C. When the peaks or shoulders were present both in a low temperature range and in a high temperature range as shown in FIGS. 1 and 2, the number was judged as "2" in FIG. 1, and the number was judged as "3" in FIG. 2.
(4) Measurement of Refractive Index The refractive index at 25° C. for the test specimen prepared above was measured according to JIS K7105 using an Abbe's refractometer (manufactured by Atago Co., Ltd.).
(5) Modulus of Elasticity The stress (σ) at a 2% strain (Δl) was measured at a tensile speed of 10 mm/min. using a tensile testing machine (manufactured by Shimazu Inc.).

The modulus of elasticity was defined and caluculated as follows.

$$\text{Modulus of elasticity} = \sigma/\Delta l$$

(6) Releasability

The liquid curable resin composition shown in Table 1 was poured between a Fresnel lens mold and a PMMA substrate (10 cm×10 cm) with a thickness of 2 mm. The PMMA substrate was pressed so that the resin composition layer had a uniform thickness. The resin layer was cured by irradiating with ultraviolet rays at a dose of 1.0 J/cm$^2$ from the side of the substrate. The cured resin (hereinafter referred to as "lens substrate") was removed from the mold by hand. A cured film easily removed from the mold was evaluated as "O", a cured film removed with some force was evaluated as "Δ", and a cured film which was not removed, with part of the resin layer adhering to the mold, was evaluated as "X".
(7) Adhesion to Substrate The adhesion to the PMMA substrate of the lens substrate removed from the lens mold was evaluated by a cross-cut peeling test according to JIS K5400 from the side removed from the mold. A lens substrate for which the square was not peeled from the PMMA substrate but adhered perfectly to the PMMA substrate was evaluated as "O", a lens substrate for which part of the squares was peeled from the PMMA substrate was evaluated as "Δ", and a lens substrate for which all the squares were peeled from the PMMA substrate was evaluated as "X".
(8) Abrasion Resistance Two sheets of the lens substrate removed from the lens mold were superposed at the lens surfaces by applying a predetermined pressure. The abrasion resistance was evaluated by oscillating one lens substrate while securing the other lens substrate. The surface conditions of the lens was observed after oscillating the lens substrate for 5 minute at the oscillating cycle resulting in a back-and-forth movement twice a second at an interval of 4 cm. A lens substrate for which the lens was not abraded or did not break was evaluated as "O", a lens substrate for which part of the lens was abraded or broken was evaluated as "Δ", and a lens substrate for which the lens was abraded or broken over the whole surface was evaluated as "X".

(9) Shape Restorability

A metal ball indenter with a diameter of 0.4 mm was pressed into the lens surface of the lens substrate removed from the lens mold with a 30 g load for one minute. The period of time required for the ball mark on the lens surface to disappear was measured. A lens substrate for which the ball mark disappeared within 30 minutes was evaluated as "O", a lens substrate for which the ball mark disappeared in more than 30 minutes but one hour or less was evaluated as "Δ", and a lens substrate for which the ball mark did not disappear after one hour was evaluated as "X".

Mn Indicates a Polystyrene-reduced Number Average Molecular Weight Determined by a GPC Method The cured products of Examples 1–4 shown in Table 1 have at least two maximums or shoulders in the temperature dependency curve of the loss tangent.

Effect of the Invention

The liquid curable resin composition of the present invention provides a cured product exhibiting a high refractive index, superior adhesion to the substrate, restorability of the shape, and abrasion resistance. Therefore the resin composition is suitable for manufacturing optical parts such as a lens sheet.

What is claimed is:

1. A photocurable resin composition comprising:
   (A) a urethane (meth)acrylate produced by reacting at least a diol shown by the following formula (2), a

TABLE 1

|  |  | Example | | | | Comparative Example | | |
|---|---|---|---|---|---|---|---|---|
|  |  | 1 | 2 | 3 | 4 | 1 | 2 | 3 |
| Component (A) | A-1 | 38.8 | | | | | | |
|  | A-2 | | 51.5 | | | | 51.5 | |
|  | A-3 | | | 46.3 | 38.7 | | | |
| Other component | D-1 | | | | | 40.0 | | |
|  | D-2 | | | | | | | 40.0 |
| Component (B) | B-1 | 24.3 | 28.2 | 21.2 | 35.7 | 24.3 | | 24.3 |
|  | B-2 | 11.7 | 11.7 | 15.5 | | 11.7 | | 11.7 |
| Other component | E-1 | | | | | | 28.2 | |
|  | E-2 | | 5.3 | 8.7 | | | 5.3 | |
|  | E-3 | 10.7 | | 4.9 | 10.6 | 10.7 | 11.7 | 10.7 |
|  | E-4 | 11.2 | | | 9.7 | 11.2 | | 11.2 |
|  | E-5 | | | | 1.9 | | | |
| Component (C) | C-1 | 2.8 | 2.8 | 2.9 | 2.9 | 2.8 | 2.8 | 2.8 |
| Other component | F-1 | 0.5 | 0.5 | 0.5 | 0.5 | 0.5 | 0.5 | 0.5 |
| Liquid property | Viscosity (cps/25° C.) | 7,200 | 10,000 | 7,600 | 7,100 | 24,000 | 12,000 | 16,000 |
| Properties of | Refractive index ($n_D^{25}$) | 1.553 | 1.547 | 1.551 | 1.551 | 1.569 | 1.527 | 1.563 |
| cured product | Modulus of elasticity (kg/mm$^2$) | 16 | 5 | 6 | 12 | 83 | 9 | 58 |
|  | Releasability | O | O | O | O | X | O | O |
|  | Adhesion to substrate | O | O | O | O | X | O | X |
|  | Abrasion resistance Restorability | O | O | O | O | X | Δ | X |

The components shown in Table 1 were as follows.

Component (B)
B-1; Phenoxyethyl acrylate: "New Frontier PHE" manufactured by Daiichi Kogyo Seiyaku Co., Ltd.
B-2; Acrylate of p-cumylphenol to which 2 mols of ethylene oxide was added, Mn=354: "Aronix M110" manufactured by Toagosei Co., Ltd.

Component (C)
C-1; 2-Hydroxy-cyclohexyl-benzophenone: "Irgacure 184" manufactured by Ciba Specialty Chemicals Co., Ltd.

Other Components
E-1; Isobornyl acrylate: "IBXA" manufactured by Osaka Organic Chemical Industry Co., Ltd.
E-2; N-vinylpyrrolidone: N-vinylpyrrolidone manufactured by BASF
E-3; Epoxy acrylate produced by adding acrylate to diglycidyl ether of bisphenol A, Mn=510: "Ripoxy VR-77" manufactured by Showa Highpolymer Co., Ltd.
E-4; Diacrylate of diol of bisphenol A to which 4 mols of ethylene oxide was added, Mn=512: " Viscoat 700" manufactured by Osaka Organic Chemical Industry Co., Ltd.
E-5; Dipentaerythritol hexacrylate: "DPHA" manufactured by Nippon Kayaku Co., Ltd.
F-1; Coating surface improver: "SH-190" manufactured by Toray-Dow Corning Silicone Co., Ltd.

polyether polyol with a number average molecular weight of 500 or more having an alkyleneoxy structure in the molecule, an organic polyisocyanate compound, and a (meth)acrylate containing a hydroxyl group,

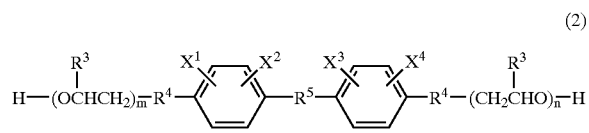

(2)

wherein each $R^3$ individually represents a hydrogen atom or a methyl group, each $R^4$ individually represents an oxygen atom or sulphur atom, $R^5$ represents —$CH_2$—, —$C(CH_3)_2$—, —S—, —SO—, or —$SO_2$—, $X^1$, $X^2$, $X^3$, and $X^4$ individually represent a hydrogen atom, a methyl group, or bromine atom, and m and n represent integers from 0 to 9, (B) a monofunctional (meth)acrylate shown by the following formula (1),

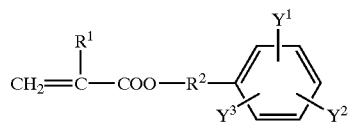 (1)

wherein $R^1$ represents a hydrogen atom or a methyl group, $R^2$ represents —$(CH_2CH_2O)_p$—, —$(CH(CH_3)CH_2O)_q$—, or —$CH_2CH(OH)CH_2O$—, $Y^1$, $Y^2$, and $Y^3$ individually represent a hydrogen atom, bromine atom, alkyl group having 1–10 carbon atoms, phenyl group, or —$C(CH_3)_2C_6H_5$—, and p and q represent integers from 0 to 10; and (C) a photoinitiator.

2. The photocurable resin composition according to claim 1, wherein compound A is present in 20–80 wt %, compound B is present in 10–70 wt %, and compound C is present in 0, 1–10 wt %, for 100 wt % of the total resin composition.

3. The composition of claim 1, wherein the composition, after cure, exhibits a temperature dependency curve of a loss tangent having at least two peaks or shoulders at a temperature range between −150 and 100° C. when an oscillation frequency of 10 Hz is applied using a dynamic viscoelasticity measuring device.

4. The composition of claim 1 wherein the composition, after cure, has a refractive index of 1.53 or more at 25° C.

5. The composition of claim 1, wherein the composition, after cure, has a Young's modulus of 0.5–30 kg/mm².

6. A process for the manufacture of optical parts comprising curing the photocurable resin composition according to claim 1.

7. The composition of claim 1, wherein n is 2.

8. The composition of claim 1, wherein m is 2.

9. The composition of claim 8, wherein m is 2.

* * * * *